Oct. 28, 1952 P. E. CHANEY ET AL 2,615,779
DRIVING AND RECORDING MECHANISM FOR CALIPERING DEVICES
Filed Oct. 26, 1945 3 Sheets-Sheet 2
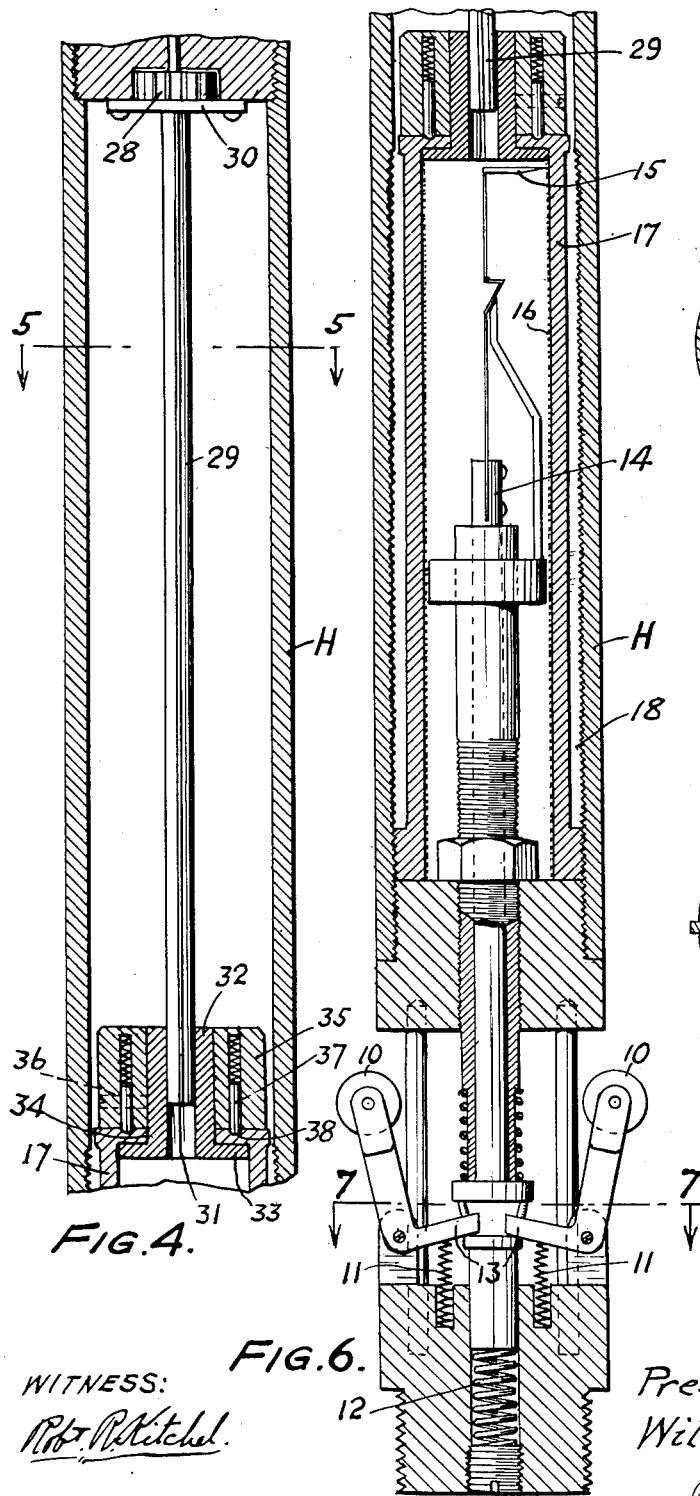
FIG. 4.
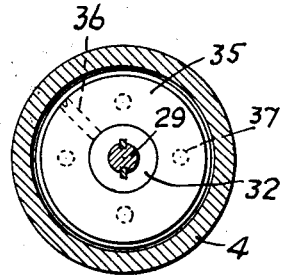
FIG. 5.
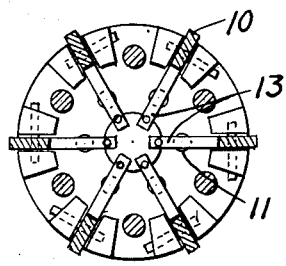
FIG. 7.
FIG. 6.
WITNESS:
Robt. R. Kitchel
INVENTORS
Preston E. Chaney &
William E. Barnes
BY
Busser and Harding
ATTORNEYS.

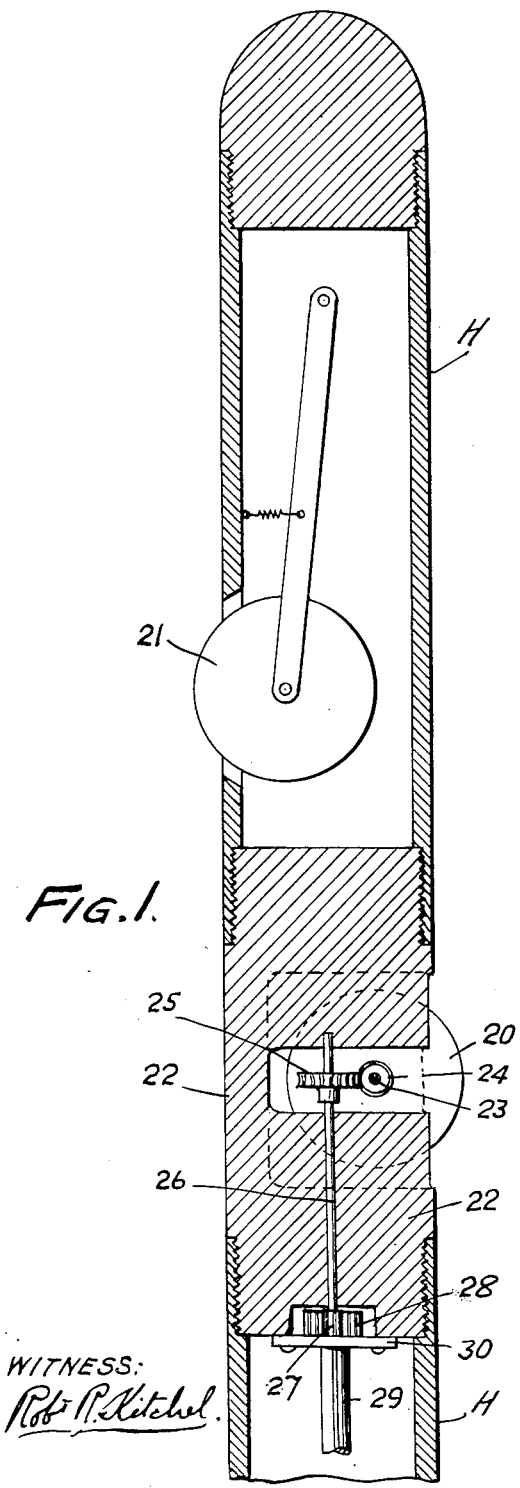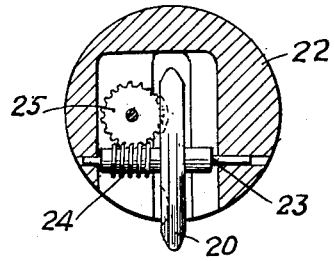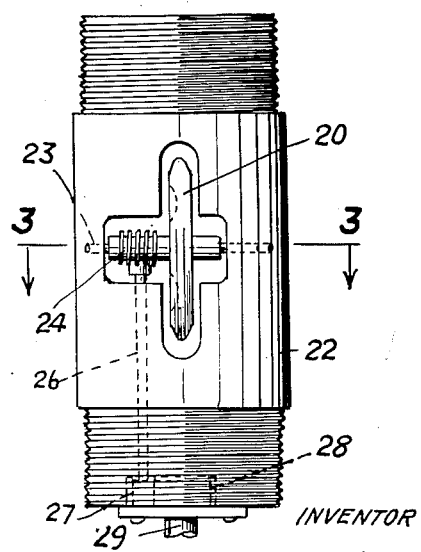

Oct. 28, 1952 P. E. CHANEY ET AL 2,615,779
DRIVING AND RECORDING MECHANISM FOR CALIPERING DEVICES
Filed Oct. 26, 1945 3 Sheets-Sheet 3

INVENTORS
Preston E. Chaney &
William E. Barnes
BY
Busser and Harding
ATTORNEYS.

WITNESS:

Patented Oct. 28, 1952

2,615,779

UNITED STATES PATENT OFFICE 2,615,779

DRIVING AND RECORDING MECHANISM FOR CALIPERING DEVICES

Preston E. Chaney and William E. Barnes, Beaumont, Tex., assignors to Sun Oil Company, Philadelphia, Pa., a corporation of New Jersey Application October 26, 1945, Serial No. 624,813

1 Claim. (Cl. 346—132)

This invention relates to calipering devices for measuring and recording variations of internal surface configurations, such as the internal diameters of oil well tubing or the like and more particularly to a self-contained mechanically driven recording mechanism to be used in such calipering devices.

It is a principal object of this invention to provide a calipering device of the type employing a stylus which is operated in response to internal variations of the tubing being examined which cooperates with a recording cylinder in a manner to produce a continuous or spiral record. Another object is to control the relative movements of the stylus and recording cylinder which effects the continuous record in such manner that the record produced will give a true indication of the surface condition of a tubing being calipered.

It is also an object of this invention to provide a driving mechanism for the recording cylinder which insures that it will be rotated and simultaneously moved axially in one direction only in order to provide an accurate record of the condition of the tubing.

Another object of this invention is to provide simplified mechanical driving means for rotating and axially moving a recording cylindrical chart relative to a stylus point in response to movement of the driving means through a tube or pipe which is being examined.

Further objects and advantages of the invention will be apparent by reference to the following specification and drawings, in which:

Figure 1 is a longitudinal section of one end of the device containing one form of driving mechanism.

Figure 2 is a side elevation of a detail of parts of Figure 1.

Figure 3 is a transverse section on the line 3—3 of Figure 2.

Figure 4 is a longitudinal broken section in continuation of Figure 1.

Figure 5 is a transverse section on the line 5—5 of Figure 4.

Figure 6 is a longitudinal section in continuation of Figure 4 showing the recording cylinder together with associated stylus actuating mechanism.

Figure 7 is a transverse section on line 7—7 of Figure 6.

Figure 9:
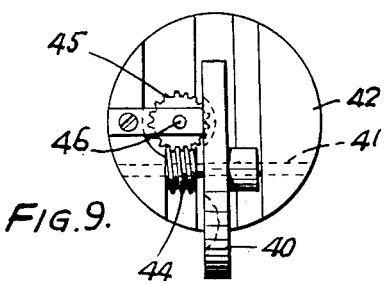
Figure 9 is a detail of Figure 8.

The calipering device of this invention is comprised generally of an elongated housing H containing at one end, which may be considered either the lower end portion or upper end portion of the device, the driving mechanism as shown in Figure 1 for actuating the recording chart operating mechanism which is mounted generally in the central portion of the housing as shown in Figure 4 and which in turn cooperates with the stylus and feeler mechanism located in the other end portion of the housing as shown in Figure 6. To one end of the device may be connected a solid steel line (not shown) of small diameter for lowering the assembly into the well tubing. Since the device is particularly adapted for calipering tubing under high pressure the use of a thin wire line permits the tubing to be securely packed at its inlet end, for example, by the use of conventional packing rings. As the assembly is raised or lowered into the well tubing, the driving mechanism at one end portion engages the tubing inner walls and operates mechanism for rotating a recording chart while as the indicators or stylus actuators at the other end of the device engage the walls, the recording stylus is actuated in reciprocation to effect the record of variations in the internal surface of the tubing under examination. The cooperation of the stylus and recording chart with each other is such that a spiral record from the top to the bottom of a cylindrical chart is produced, and changes in internal diameter or depressions on the internal surfaces are indicated by angular deviations from a true spiral line. Suitable ratchet mechanism is provided to cause the recording to be effected only during either the downward or the upward movement of the assembly as desired so as to prevent a double record from being obtained.

In Figure 6 of the drawings is a longitudinal section of one end of the complete calipering and recording device which contains the feeler mechanism and the recording stylus, the details of which are fully described in our co-pending application for Recording Stylus Actuating Mechanism, Serial No. 624,812, filed of even date herewith, now abandoned, and will be referred to only generally in the present application.

The feelers or stylus actuators 10 mounted on pivoted rocker arms are positioned adjacent one end of a housing and each actuator is independently urged outwardly to its extended position by springs 11 while the actuators as a group are urged outwardly by spring 12. The movement of the feelers in response to irregularities in internal surface configurations of tubing under examination is translated through the short lever arms 13 of the rocker arms into axial movement and operates a push rod 14 controlling the movement of a stylus 15 which effects a record on a recording surface 16 of the record cylinder 17 which is rotatable and movable axially of the stylus 15. The recording chart will be of the type disclosed in our patent application for Cylindrical Recording Chart Construction, Serial No. 624,814 filed of even date herewith, now Patent #2,539,009.

The recording cylinder 17 containing the chart 16 is provided with a flange at its lower end having threads thereon which cooperate with internal threads 18 on the housing H. The housing H comprises several tubes which are inter-connected by screw threaded end portions together providing a closure for the entire mechanism and permitting the housing to be separated into sections for inspection or removal of the various parts enclosed therein. The pitch of the cooperating threads 18 in this Fig. 6 portion of the housing will determine the spacing between the spiral lines made on the recording chart by the stylus. During the calipering operation the actuators 10 heretofore referred to effect reciprocation of the stylus 15 in accordance with the variation in surface configuration encountered by the actuators 10 within the tubing being examined and the recording chart cylinder 17 will be rotated by means hereinafter described, and during its rotation will move axially of the housing H through the cooperating threads on the inner wall of the housing and the end of cylinder 17 and thus the record made by the stylus will be in the form of a spiral beginning at one end of the recording chart and ending at its other end with the variations in surface configurations indicated by angular lines which deviate from the spiral.

The driving mechanism for operating the chart is disposed at one end of the housing and for a description of this portion of the apparatus reference is made to Figures 1, 2 and 3 of the drawings. A pair of cooperating wheels 20 and 21 are positioned diametrically opposite on the housing and the wheel 20 is maintained in frictional rotative contact with the inner wall of the tubing to be calipered through the cooperation of wheel 21 which is held in spring pressed rotative relation with the inner wall. As the device is lowered into the tubing to be examined wheel 20 drives, through suitable gearing, shaft 29 which is fixed to the recording chart cylinder 17 and drives the same. The wheel 20 is mounted in a block indicated at 22 which is cut away to receive a portion of the wheel and gear mechanism for actuating the shaft 29. Referring to Figures 2 and 3 for details of the arrangement the wheel 20 is provided with a shaft 23 rotatably secured in the block 22, and having at one end a worm 24 which cooperates with a gear 25 positioned at one end of a shaft 26 extending longitudinally through the block 22 and which is provided at its other end with pinion gear 27 which is geared to a spur gear 28 on the shaft 29 which actuates the chart cylinder 17.

In Figures 4 and 6 are shown details of the connections between the shaft 29 and the chart cylinder 17. The shaft 29 is splined and engages rotatable coupling sleeve 32 at 31. Coupling sleeve 32 has a flanged end 33 on which is received the upper flanged end of the chart cylinder 17 and the body portion of the coupling sleeve extends through an opening 34 in the end of cylinder 17. A collar 35 is positioned around the end of the coupling sleeve 32 and is provided with a set screw 36 so as to be fixed to and rotatable with the coupling sleeve 32. Rotation of the collar 35 is transmitted to the recording cylinder 17 by providing spring loaded plungers 37 which are received in shallow indentations 38 provided on the upper flanged surface of cylinder 17. It will be seen from the above description that through rotation of splined shaft 29 during normal operation of the calipering device that the cylinder 17 will be rotated but when the cylinder has reached its upper limit of movement the clutch mechanism prevents further rotation of the cylinder 17 since the coupling sleeve 32 will rotate freely within the cylinder without affecting rotation of the cylinder.

A modified form of driving mechanism is disclosed in Figures 8 to 13 of the drawings and provides an overload release and unidirectional latch arrangement which is is adaptable to be incorporated in the calipering mechanism to effect rotating of the chart cylinder 17 in only one selected direction during movement of the calipering device into or out of the tubing under examination. The chart cylinder 17 will be driven in response to the frictionally driven wheel 40 which is rotatably mounted on shaft 41 secured in one section 42 of a support block shown at upper end of Fig. 8 while the other section 43 of the support block shown in Fig. 8 directly below section 42 is adapted to receive other elements of the chart cylinder driving mechanism. The sections may be removably secured together through suitable screw connections for insertion into the housing H of the calipering device. A worm 44 is provided on one end of shaft 41 and is arranged to mesh with a worm gear 45 shown in detail in Fig. 9 for rotating a rod 46 which extends through section 42 of the support block and has at its other end a pinion 47 located in a recess in the lower end of section 42. When the sections 42 and 43 are secured together a spur worm gear 48 carried by section 43 is positioned in the recess of section 42 and meshes with pinion gear 47, and a driving shaft 49 extending through section 43 of the support block is rotated through the connections just described. The desired rate of rotation of shaft 49 can be had by proper selection of the ratios of the several worms and pinion gears.

Figure 13:
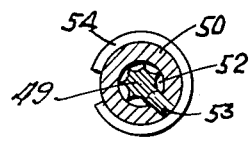
Figure 13 is a view taken on the line 13—13 of Figure 8.
Figure 8:
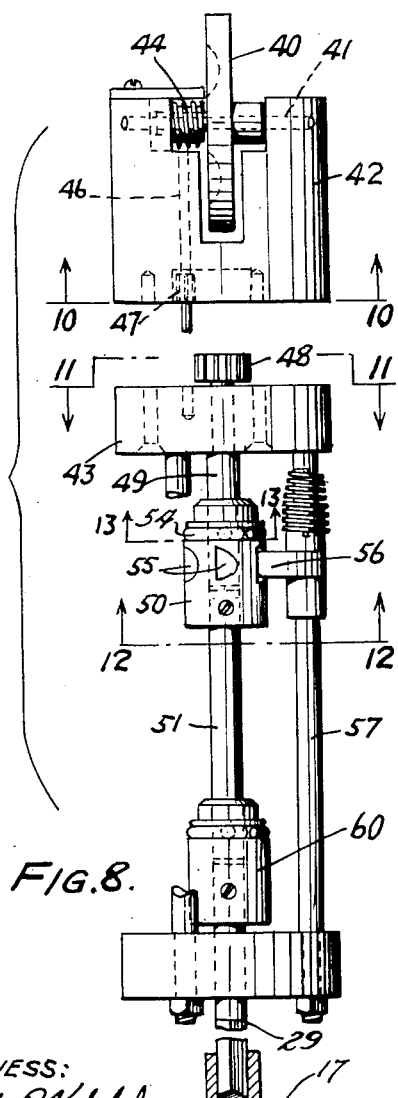
Figure 8 is an elevational view showing parts of a modified form of driving mechanism.
Figure 10:
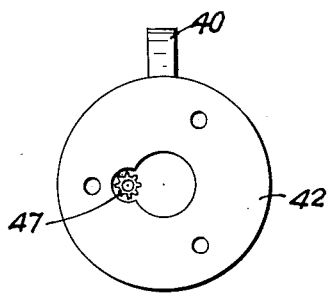
Figure 10 is a view taken on the line 10—10 of Figure 8.
Figure 11:
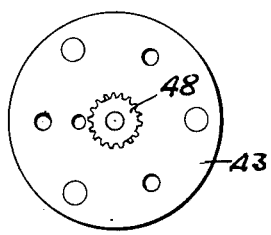
Figure 11 is a view taken on the line 11—11 of Figure 8.
Figure 12:
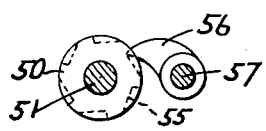
Figure 12 is a view taken on the line 12—12 of Figure 8.

A collar 50 is secured to the upper end of a driven shaft 51 and receives the lower end of driving shaft 49 which is spaced from shaft 51 to prevent frictional contact during their relative rotative movement. The end of shaft 49 is fluted as shown in Fig. 13 providing shallow grooves 52 therein to receive a pin 53 which extends radially through the coupling 50 and is spring pressed into the grooves 52 by a spring ring 54. This arrangement constitutes an overload release mechanism which provides for rotation of shaft 51 when the shaft 49 is driven through the drive wheel 40 and during normal operation of the calipering device the shaft 51 will continue to rotate but in the event of jamming of the device or when the chart has reached its limit of axial or longitudinal movement further rotation of shaft 51 will be prevented since pin 53 will be forced out of the indentations 52 on the continued rotation of driving shaft 49 and this shaft will merely rotate within the collar 50 and the collar will become stationary.

It will be understood that the shaft 51 is connected to rotate the chart chamber 17 and in order to provide for unidirectional rotation of the chamber or cylinder 17 the coupling 50 is provided with a series of notches 55 on its outer periphery which are adapted to receive a spring pressed pawl 56 secured adjacent the coupling 50 on a post 57. This arrangement constitutes unidirectional latch means which permit the coupling 50 to be driven only in a clockwise direction and hence the chart chamber 17 will be rotated clockwise and be prevented from rotating counterclockwise when the device has been inserted into well tubing and is being pulled out to effect the calipering and recording.

Conversely with the above described overload release and unidirectional latch arrangement the calipering and recording device can be inserted into the tubing to be examined and the pawl 56 will prevent rotation of coupling 50 which in turn will force the pin 53 out of the grooves 52 on the shaft 49 and this shaft will rotate freely within the coupling 50 and the record cylinder will not be rotated during the insertion of the device into tubing which is to be calipered.

The overload release and latch mechanism is particularly important since the complete calipering and recording mechanism can be lowered into tubing of great depths without actuating the chart and when the calipering device is being raised through the tubing the drive wheel 40 will rotate in a direction opposite to that which it rotated as it entered the tubing and the coupling 50 will then rotate in the direction permitted by the latch mechanism, and the shaft 51 will be driven to operate the chart cylinder. In this manner the calipering device can be made to record only when the device is being moved in an upward direction.

It will be seen that any selected sections of the well tubing can be examined. For example, the device could be lowered to the one thousand foot depth without operating the recording mechanism and then could be brought to the surface to effect the recording. By proper selection of the cooperating threads which permit rotation and axial movement of the chart cylinder or chamber the chart would be provided with a record of the condition of the tubing from the one thousand foot depth up to the surface. Likewise, one thousand foot sections of tubing below the one thousand foot level could be examined and recordings of these sections made on the chart. Thus a complete examination and recording of the condition of wells of any depth can be made.

A second coupling member 60 is provided between shaft 51 and chart drive shaft 29. This coupling can be arranged to function in a manner similar to the overload release arrangement above described in connection with coupling 50. When coupling 60 is arranged to function in a manner similar to coupling member 50 it will permit rotation of the chart chamber 17, after a calipering operation has been made, in a direction opposite to that which it had during the recording operation so that the chart chamber can be manually returned to its original starting position ready for another calipering and recording operation.

Having described our invention, what we claim and desire to protect by Letters Patent is:

In an internal tube wall calipering and recording device adapted to be passaged through an extended length of tubing and comprising an elongated housing carrying recording means including a recorder member and a stylus member positioned in scribing relation therewith, and driving means for said recording means, the improvement which comprises a drive member carried by said housing and arranged for continuous rotating frictional contact with the tube wall during passage of the device through the tubing, mechanical transmission means including a driving shaft operable by rotation of said drive member in either direction and a driven shaft adapted to effect relative movement of said recorder and stylus members when the device is passaged through the tubing in a calipering direction, one of said shafts being longitudinally fluted, an overload release mechanism connecting said shafts and comprising a collar secured to the other of said shafts and extending around a fluted portion of said one shaft and a spring pressed pin carried by said collar and adapted to enter the flutes to effect driving engagement between said shafts, and unidirectional latch means located between the overload release connection and said recording means for preventing the driving of said driven shaft when the device is passaged in a non-calipering direction.

PRESTON E. CHANEY.
WILLIAM E. BARNES.

REFERENCES CITED

The following references are of record in the file of this patent:

UNITED STATES PATENTS

| Number | Name | Date |
|---|---|---|
| 222,292 | Luders | Dec. 2, 1879 |
| 236,257 | Quimby | Jan. 4, 1881 |
| 526,383 | Dale | Sept. 25, 1894 |
| 565,695 | Smith et al. | Aug. 11, 1896 |
| 713,784 | Mellor | Nov. 18, 1902 |
| 1,339,955 | Hardel | May 11, 1920 |
| 1,440,798 | Revega | Jan. 2, 1923 |
| 1,805,343 | Robbins | May 12, 1931 |
| 1,815,672 | Jones | July 21, 1931 |
| 1,837,222 | Kannenstine | Dec. 22, 1931 |
| 1,901,567 | Rogatz | Mar. 14, 1933 |
| 1,938,872 | Stone et al. | Dec. 12, 1933 |
| 1,951,629 | Ross | Mar. 20, 1934 |
| 2,102,080 | Kinley | Dec. 14, 1937 |
| 2,121,614 | Stark | June 21, 1938 |
| 2,223,913 | Johnston | Dec. 3, 1940 |
| 2,544,609 | McMahan | Mar. 6, 1951 |

OTHER REFERENCES

Publ.: "The Oil and Gas Journal," January 6, 1945, pages 46–47.